United States Patent
Sumi

(10) Patent No.: US 12,428,857 B2
(45) Date of Patent: Sep. 30, 2025

(54) LAYING MATERIAL, STRUCTURE FOR FITNESS STUDIO, AND STRUCTURE FOR SAUNA

(71) Applicant: Lava International, Inc., Tokyo (JP)

(72) Inventor: Takahiko Sumi, Tokyo (JP)

(73) Assignee: LAVA INTERNATIONAL, INC., Tokyo (JP)

( * ) Notice: Subject to any disclaimer, the term of this patent is extended or adjusted under 35 U.S.C. 154(b) by 157 days.

(21) Appl. No.: 17/921,379

(22) PCT Filed: Apr. 28, 2021

(86) PCT No.: PCT/JP2021/016961
§ 371 (c)(1),
(2) Date: Oct. 26, 2022

(87) PCT Pub. No.: WO2021/221102
PCT Pub. Date: Nov. 4, 2021

(65) Prior Publication Data
US 2023/0349170 A1    Nov. 2, 2023

(30) Foreign Application Priority Data

May 1, 2020  (JP) ................. 2020-081025

(51) Int. Cl.
*E04F 15/02*    (2006.01)
*A61H 33/06*    (2006.01)
(Continued)

(52) U.S. Cl.
CPC ..... *E04F 15/02177* (2013.01); *A61H 33/063* (2013.01); *A61H 33/067* (2013.01);
(Continued)

(58) Field of Classification Search
CPC ... E04F 15/041; E04F 15/02177; E04F 15/04; E04F 15/107; A61H 33/063; A61H 33/067; A61H 2201/169; F24D 13/024
See application file for complete search history.

(56) References Cited

U.S. PATENT DOCUMENTS

2007/0089229 A1*  4/2007  Yatomi ............... A61H 33/063
                                                        4/524
2010/0239679 A1*  9/2010  Greene ................. A01N 25/10
                                                        424/490
(Continued)

FOREIGN PATENT DOCUMENTS

CN        104131682 A       11/2014
FR        2899793 A1 *      10/2007    ........... A61H 33/063
(Continued)

OTHER PUBLICATIONS

International Search Report of the International Searching Authority mailed on Jul. 27, 2021, from International Application No. PCT/JP2021/016961, filed on Apr. 28, 2021. 5 pages.
(Continued)

*Primary Examiner* — Christine T Cajilig
(74) *Attorney, Agent, or Firm* — HoustonHogle LLP

(57) ABSTRACT

The present invention addresses the problem of providing a flooring material whereby it becomes possible to improve an anti-aging effect of an activity in various facilities. The present invention provides a flooring material containing a stone material, in which the stone material contains silicon dioxide in an amount of 67.0 to 80.0% by mass, inclusive, relative to the whole amount of the stone material.

9 Claims, 6 Drawing Sheets

(51) Int. Cl.

| | | |
|---|---|---|
| *B32B 5/02* | (2006.01) | |
| *B32B 9/00* | (2006.01) | |
| *B32B 9/04* | (2006.01) | |
| *B32B 21/02* | (2006.01) | |
| *B32B 21/04* | (2006.01) | |
| *B32B 21/10* | (2006.01) | |
| *B32B 21/14* | (2006.01) | |
| *E04F 15/04* | (2006.01) | |
| *E04F 15/10* | (2006.01) | |
| *F24D 13/02* | (2006.01) | |

(52) U.S. Cl.
CPC ............... *B32B 5/02* (2013.01); *B32B 9/002* (2013.01); *B32B 9/042* (2013.01); *B32B 21/02* (2013.01); *B32B 21/042* (2013.01); *B32B 21/10* (2013.01); *B32B 21/14* (2013.01); *E04F 15/04* (2013.01); *E04F 15/107* (2013.01); *F24D 13/024* (2013.01); *A61H 2201/169* (2013.01); *B32B 2471/00* (2013.01)

(56) References Cited

U.S. PATENT DOCUMENTS

| | | | | |
|---|---|---|---|---|
| 2010/0260866 | A1* | 10/2010 | Lu | A01N 25/08 |
| | | | | 424/688 |
| 2015/0047805 | A1* | 2/2015 | Gregory | E04F 13/16 |
| | | | | 165/53 |
| 2015/0233126 | A1* | 8/2015 | Desing | E04B 1/942 |
| | | | | 156/307.7 |
| 2016/0310776 | A1* | 10/2016 | Smith | A61H 33/06 |
| 2018/0087788 | A1* | 3/2018 | Koizumi | F24F 6/18 |

FOREIGN PATENT DOCUMENTS

| | | | |
|---|---|---|---|
| JP | S 64-069564 A | 3/1989 | |
| JP | H 10-183958 A | 7/1998 | |
| JP | 2002-065803 A | 3/2002 | |
| JP | 2006-263402 A | 10/2006 | |
| JP | 2007-021126 A | 2/2007 | |
| JP | 2017-062069 A | 3/2017 | |
| KR | 10-2004-0028307 A | 4/2004 | |
| KR | 100915274 B1 * | 9/2009 | |
| KR | 10-2015-0089417 A | 8/2015 | |
| WO | WO-2006118336 A1 * | 11/2006 | ............ A61H 33/06 |

OTHER PUBLICATIONS

Written Opinion mailed on Jul. 27, 2021, from International Application No. PCT/JP2021/016961, filed on Apr. 28, 2021. 4 pages.
Tolahunase, M., et al., "Imact of Yoga and Meditation on Cellular Aging in Apparently Healthy Individuals: A Prospective, Open-Label Single-Arm Exploratory Study," Oxidative Medicine and Cellular Longevity, 2017(7928981): 1-9 (2017).
Notification of Reasons for Refusal issued in the JP Patent Application No. JP2022-518116, mailed on Jun. 27, 2023.
Mino Shirakawa Bakuhanseki Co.Ltd., "History of Bakuhanseki", the only production area in Japan, Mino Shirakawa Bakuhanseki Co.Ltd, Mar. 31, 2019, pp. 9.
International Preliminary Report on Patentability Received for International Application No. PCT/JP2021/016961 mailed on Oct. 27, 2022, 09 Pages.
Extended European Search Report mailed on Jun. 11, 2024, from European Application No. 21795810.7, filed on Apr. 28, 2021. 7 pages.
Chinese Office Action, mailed on May 13, 2025, from Chinese Application No. 202180032266.2, filed on Apr. 28, 2021. 15 pages.
Korean Office Action, mailed on Mar. 4, 2025, from Korean Application No. 10-2022-7040757, filed on Nov. 21, 2022. 11 pages.

* cited by examiner

LAYING MATERIAL, STRUCTURE FOR FITNESS STUDIO, AND STRUCTURE FOR SAUNA

RELATED APPLICATIONS

This application is a § 371 National Phase Application of International Application No. PCT/JP2021/016961, filed on Apr. 28, 2021, now International Publication No. WO 2021/221102 A1, published on Nov. 4, 2021, which International Application claims priority to Japanese Application 2020-081025 filed on May 1, 2020, both of which are incorporated herein by reference in their entirety.

TECHNICAL FIELD

The present invention relates to flooring materials, structures for fitness studios and structures for saunas.

BACKGROUND ART

As health consciousness has been increased in recent years, various types of facilities such as fitness studios and saunas have been widely used for regular exercise, health promotion and the like.

For example, yoga is one of the lessons which are offered at fitness studios and have gained the support of consumers. Yoga is an exercise which is performed by combining meditation, a plurality of postures and the like, and has been reported to have anti-aging effects and the like (see, for example, Non-Patent Document 1).

Saunas are also known to have anti-aging effects and the like (see, for example, Patent Document 1).

Patent Document 1: Japanese Unexamined Patent Application, Publication No. 2002-65803
Non-Patent Document 1: Oxidative Medicine and Cellular Longevity Volume 2017, Article ID 7928981, 9 pages

DISCLOSURE OF THE INVENTION

Problems to be Solved by the Invention

However, there is a further need for technology which can further enhance anti-aging effects obtained from activities at various types of facilities.

The present invention is made in view of the circumstances described above, and an object of the present invention is to provide a flooring material which can enhance anti-aging effects produced by activities at various types of facilities.

Means for Solving the Problems

The present inventors have found that the problem described above can be solved by a flooring material including a stone material with which a predetermined amount of silicon dioxide is mixed, with the result that the present invention has been completed. More specifically, the present invention provides the following:

(1) A flooring material including a stone material, in which the stone material includes 67.0% or more and 80.0% or less by mass of silicon dioxide with respect to the entire stone material;
(2) The flooring material described in (1), in which the stone material includes 20.0% or less by mass of aluminum oxide with respect to the entire stone material;
(3) The flooring material described in (1) or (2), in which the stone material includes 10.0% or less by mass of ferric oxide with respect to the entire stone material;
(4) The flooring material described in any one of (1) to (3), further including: a heat generator;
(5) The flooring material described in any one of (1) to (4), further including: Japanese cypress wood in an uppermost surface;
(6) The flooring material described in any one of (1) to (5), in which the flooring material is intended for use in a fitness studio;
(7) The flooring material described in (6), in which a fitness activity performed in the fitness studio is hot yoga that is performed in an indoor environment with a temperature of 30 degrees or more and 45 degrees or less and a relative humidity of 50% or more and 85% or less;
(8) A structure for fitness studios including the flooring material described in any one of (1) to (7);
(9) The flooring material described in any one of (1) to (5), in which the flooring material is intended for use in a sauna; and
(10) A structure for saunas including the flooring material described in (9).

Effects of the Invention

According to the present invention, a flooring material is provided which can enhance anti-aging effects produced by activities at various types of facilities.

PREFERRED MODE FOR CARRYING OUT THE INVENTION

Figure 1:
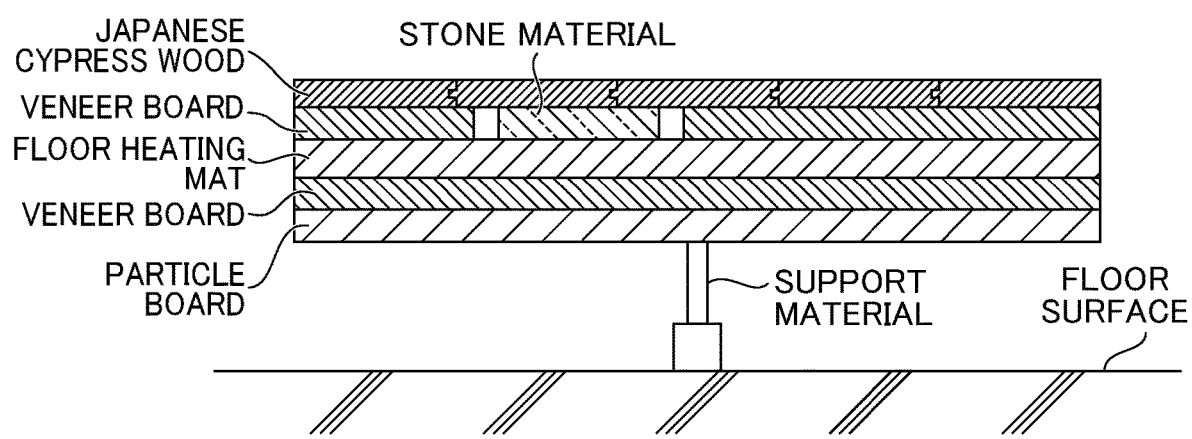
FIG. 1 is a cross-sectional view showing an example of the configuration of the flooring material of the present invention.
Figure 2:
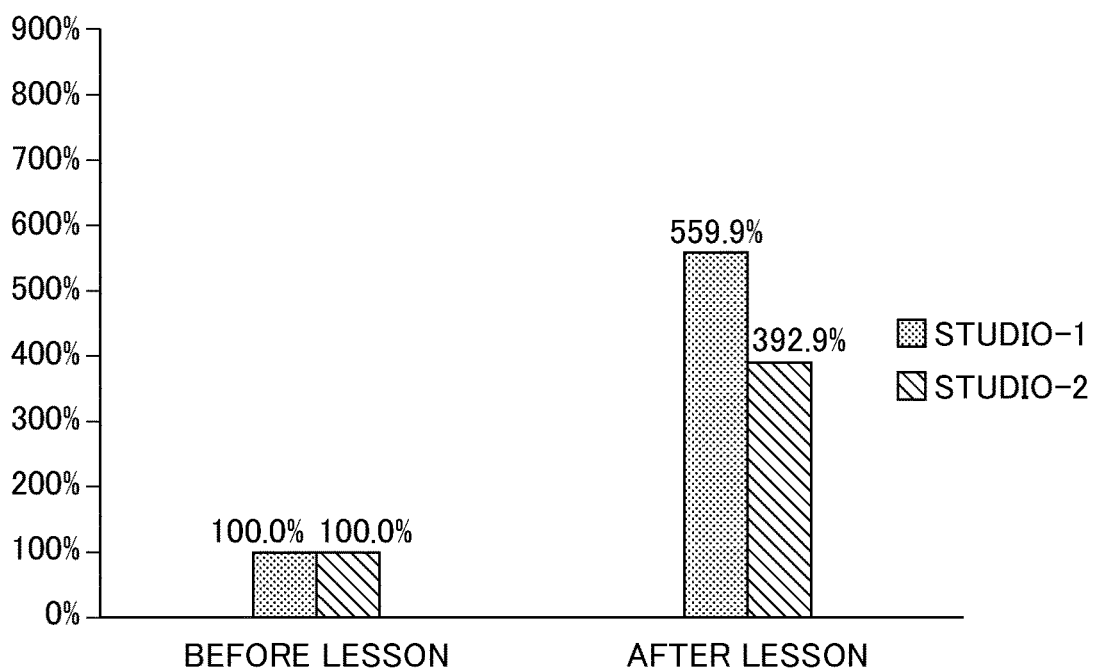
FIG. 2 is a diagram showing the influence of the flooring material of the present invention on the expression of SIRT1 after hot yoga.
Figure 3:
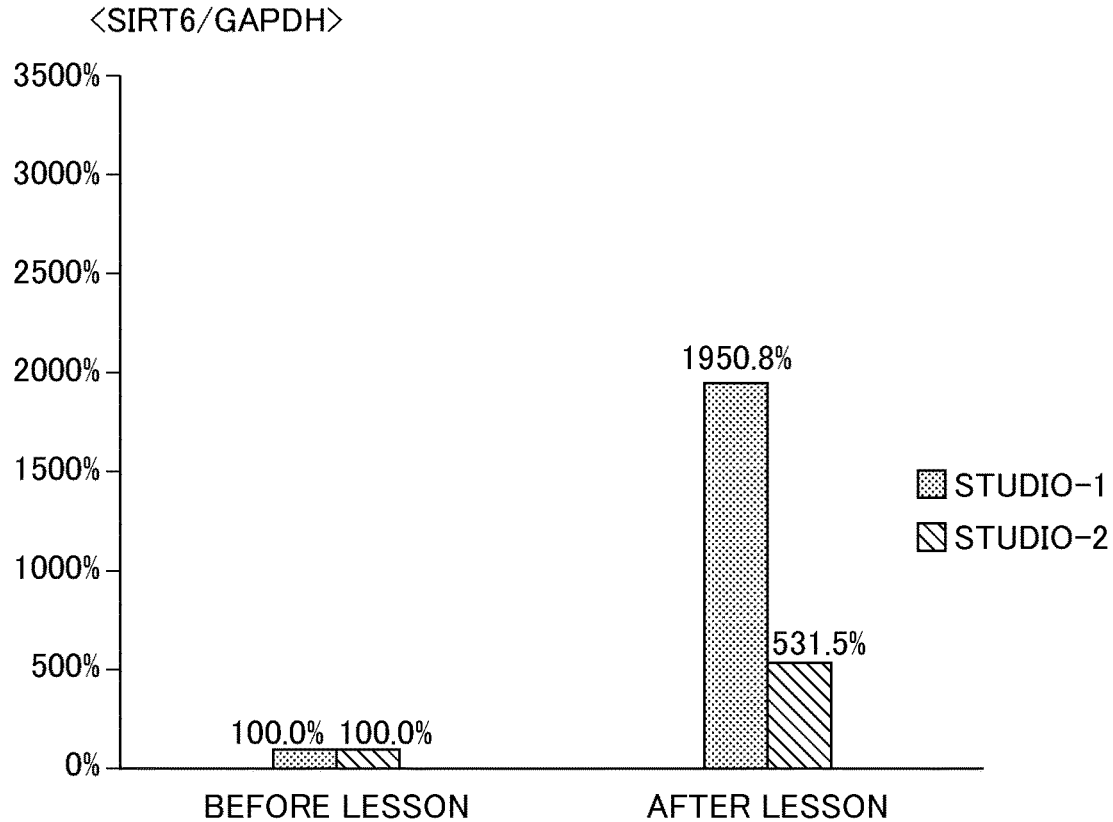
FIG. 3 is a diagram showing the influence of the flooring material of the present invention on the expression of SIRT6 after the hot yoga.
Figure 4:
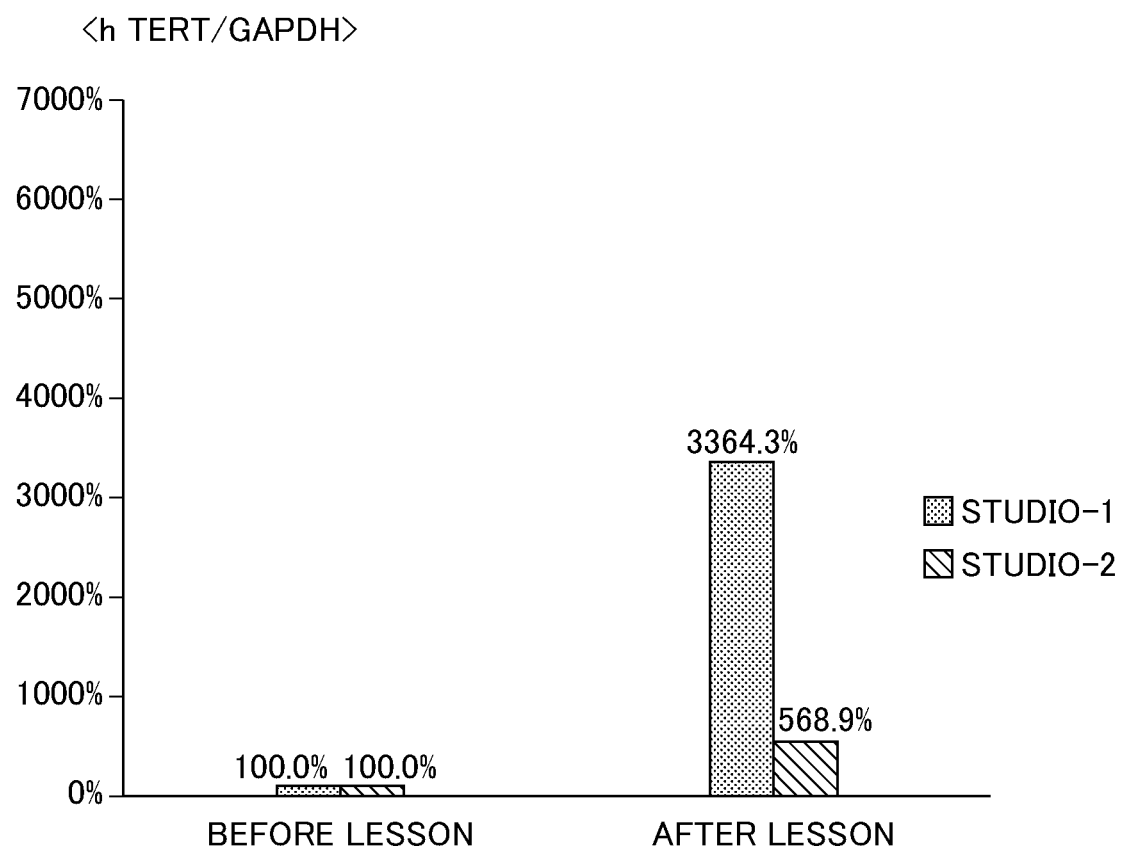
FIG. 4 is a diagram showing the influence of the flooring material of the present invention on the expression of hTERT after the hot yoga.
Figure 5:
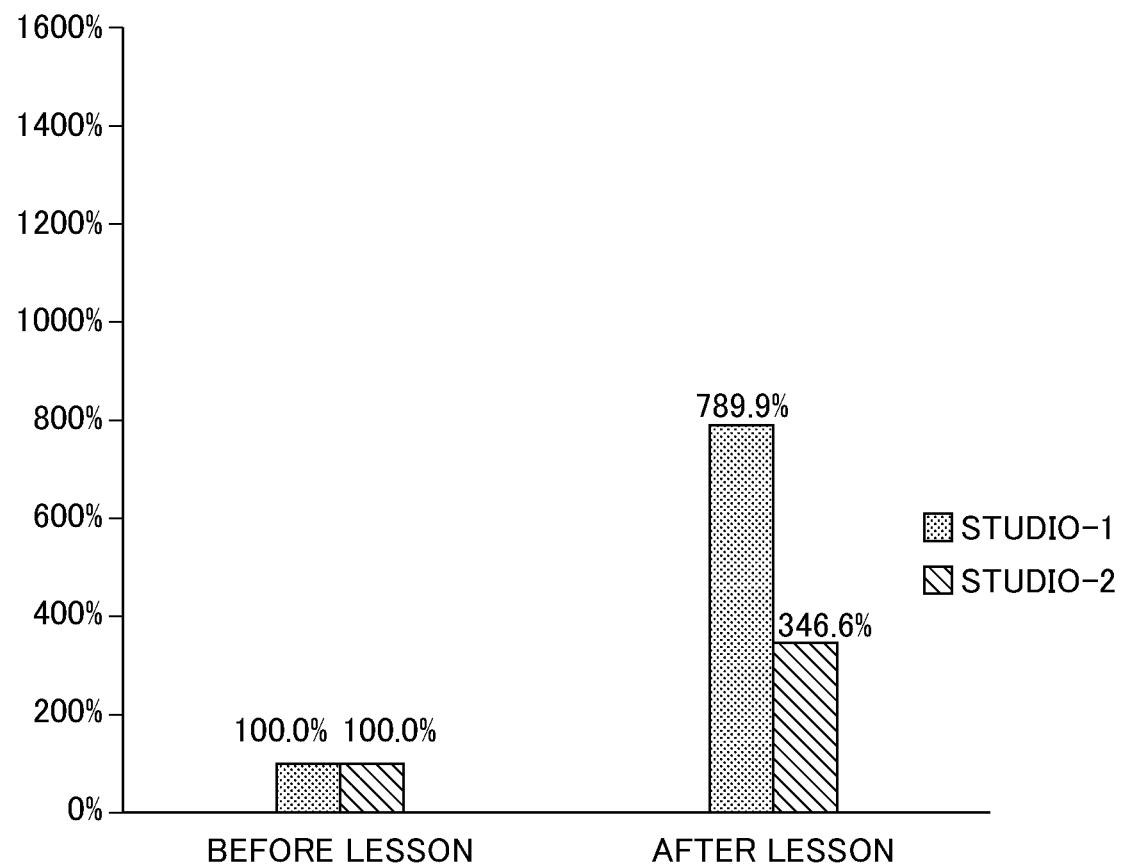
FIG. 5 is a diagram showing the influence of the flooring material of the present invention on the expression of hTERC after the hot yoga.

Although an embodiment of the present invention will be described below, the present invention is not limited to the embodiment.

<Flooring Material>
The flooring material of the present invention includes a stone material, and the stone material includes 67.0% or more and 80.0% or less by mass of silicon dioxide with respect to the entire stone material.

As compared with a normal stone material (for example, lava), the stone material in the present invention has a high silicon dioxide content. As a result of a study conducted by the present inventor, an unexpected effect is found in which when an exercise is performed under the presence of the flooring material of the stone material as described above, anti-aging effects and the like are enhanced.

The "flooring material" in the present invention means a material which covers a part or the whole of a floor surface or a wall surface (mainly a floor surface or a wall surface in an indoor space). Hence, the flooring material of the present invention can also be utilized as building materials such as a tile.

The "stone material" in the present invention means a solid which mainly includes an inorganic substance (such as a mineral), and may be a natural material (such as a rock) or may be a synthetic material. The "stone material mainly includes an inorganic substance" in the present invention means that the content of the inorganic substance in the entire stone material is preferably 95.0% or more by mass, more preferably 97.0% or more by mass and further preferably 99.0% or more by mass.

The "anti-aging effects" in the present invention means progression suppression or improvement of an age-related decline in physiological function or the like. The anti-aging effects can be evaluated by various types of aging indicators. Examples of the indicator as described above include genes related to aging, oxidative stress markers and the like.

Examples of the gene related to aging include Sirtuin 1 (SIRT1), Sirtuin 6 (SIRT6), human telomere reverse transcriptase (hTERT), human telomere RNA component (hTERC) and the like. The increased expression of these genes means that the anti-aging effects are enhanced. Whether or not each of these genes is expressed and the amount of expression of each of these genes can be identified by a PCR method (such as a real-time PCR method) or the like.

Examples of the oxidative stress marker include 8-hydroxy-2'-deoxyguanosine (8-OHdG) and the like. A decrease in the concentration of 8-OHdG in a body means a decrease in oxidative stress. The concentration of the oxidative stress marker can be identified by an ELISA method or the like.

(Composition of Stone Material)

The stone material in the present invention includes 67.0% or more and 80.0% or less by mass of silicon dioxide ($SiO_2$) with respect to the entire stone material, preferably 69.0% or more and 80.0% or less by mass and more preferably 70.0% or more and 75.0% or less by mass. Silicon dioxide is also referred to as silica anhydride.

In terms of easily achieving the effects of the present invention, the stone material in the present invention preferably includes a large amount of aluminum oxide ($Al_2O_3$). Specifically, the stone material preferably includes 20.0% or less by mass of aluminum oxide with respect to the entire stone material, more preferably includes 10.0% or more and 20.0% or less by mass and further preferably includes 15.0% or more and 19.0% or less by mass.

In terms of easily achieving the effects of the present invention, the stone material in the present invention preferably includes a large amount of ferric oxide ($Fe_2O_3$) such that the amount of ferric oxide follows the amount of aluminum oxide. Specifically, the stone material preferably includes 10.0% or more by mass of aluminum oxide with respect to the entire stone material, more preferably includes 3.0% or more and 10.0% or less by mass and further preferably includes 4.0% or more and 6.0% or less by mass.

The stone material in the present invention may include, in addition to the inorganic substances described above, any of components which are included in a conventionally known stone material. Examples of the component as described above include potassium oxide ($K_2O$), sodium oxide ($Na_2O$), calcium oxide (CaO), titanium oxide ($TiO_2$), magnesium oxide (MgO), diphosphorus pentoxide ($P_2O_5$), sulfur trioxide ($SO_3$), manganese oxide (MnO), zirconium oxide ($ZrO_2$), chromium oxide ($Cr_2O_3$), zinc oxide (ZnO), strontium oxide (SrO), rubidium oxide ($Rb_2O$), nickel oxide (NiO), copper oxide (CuO), cobalt oxide ($Co_2O_3$), lithium (Li), boron (B), vanadium (V), copper (Cu), gallium (Ga), niobium (Nb), barium (Ba), lead (Pb), cerium (Ce) and the like.

A particularly preferable composition of the stone material in the present invention is as follows. Each of the following values is a ratio of the component to the entire stone material.

Silicon dioxide: 69.0% or more and 72.0% or less by mass

Aluminum oxide ($Al_2O_3$): 17.0% or more and 19.0% or less by mass

Ferric oxide ($Fe_2O_3$): 3.0% or more and 5.0% or less by mass

Potassium oxide ($K_2O$): 1.0% or more and 3.0% or less by mass

Sodium oxide ($Na_2O$): 0.5% or more and 1.5% or less by mass

Calcium oxide (CaO): 0.5% or more and 1.2% or less by mass

Titanium oxide ($TiO_2$): 0.5% or more and 1.2% or less by mass

Magnesium oxide (MgO): 0.3% or more and 1.0% or less by mass

Diphosphorus pentoxide ($P_2O_5$): 0.05% or more and 0.2% or less by mass

Sulfur trioxide ($SO_3$): 0.05% or more and 0.2% or less by mass

Manganese oxide (MnO): 0.05% or more and 0.2% or less by mass

Zirconium oxide ($ZrO_2$): 0.01% or more and 0.1% or less by mass

Chromium oxide ($Cr_2O_3$): 0.01% or more and 0.1% or less by mass

Zinc oxide (ZnO): 0.01% or more and 0.05% or less by mass

Strontium oxide (SrO): 0.001% or more and 0.05% or less by mass

Rubidium oxide ($Rb_2O$): 0.001% or more and 0.05% or less by mass

Nickel oxide (NiO): 0.001% or more and 0.05% or less by mass

Lithium (Li): 0.001% or more and 0.01% or less by mass

Boron (B): 0.001% or more and 0.01% or less by mass

Vanadium (V): 0.001% or more and 0.01% or less by mass

Copper (Cu): 0.001% or more and 0.01% or less by mass

Gallium (Ga): 0.001% or more and 0.01% or less by mass

Niobium (Nb): 0.001% or more and 0.005% or less by mass

Barium (Ba): 0.001% or more and 0.005% or less by mass

Lead (Pb): 0.001% or more and 0.005% or less by mass

The composition of the stone material is identified by fluorescent X-ray analysis (X-ray fluorescence analysis, XRF) and ICP mass analysis (ICP-Mass Spectrometry, ICP-MS).

(Shape of Stone Material and Like)

The shape, the size, the thickness and the like of the stone material are not particularly limited, and can be adjusted according to the scale and the like of a floor surface or a wall surface on which the flooring material is installed.

The shape of the stone material may be, for example, a cylindrical shape, a plate shape, a polygonal shape, an irregular shape or the like.

For the size of the stone material, for example, the stone material may have a diameter of 10 mm or more and 10000 mm or less.

The thickness of the stone material may be, for example, 5 mm or more and 100 mm or less.

Although the stone material may be large (may have a size covering the entire floor surface or wall surface on which the flooring material is installed), the stone material may be small (may have, for example, a diameter of 10 mm or more and 200 mm or less and a thickness of 5 mm or more and 30 mm or less). In the present invention, even when the stone material is small, the number of pieces of stone material which are arranged on the floor surface or the wall surface or the arrangement thereof is adjusted, and thus satisfactory anti-aging effects can be realized.

When a plurality of pieces of stone material are used, the sizes, the shapes and the like of the pieces of stone material may be the same as or different from each other. In terms of easily controlling the effects of the present invention, when a plurality of pieces of stone material are used, the sizes, the shapes and the like thereof are preferably similar to each other.

(Configuration of Flooring Material)

As long as the flooring material of the present invention includes the stone material described above, the configuration thereof is not particularly limited. For example, the flooring material of the present invention may be formed of the stone material described above or may be a combination of a stone material and other materials.

When the flooring material of the present invention is a combination of a stone material and other materials, the other materials are not particularly limited, and any of building materials, devices and the like which are used for the floor surface and the wall surface can be used. The building material, the device and the like may be used singly or a plurality of them may be combined to be used.

[Building Material]

Examples of the building material included in the flooring material of the present invention include wood, a resin material and nets (such as a wire net and a resin net).

Examples of the wood include plywood (such as a veneer board), a particle board (one type of wood board obtained by mixing small pieces of wood with an adhesive and molding the mixture with heat and pressure), Japanese cypress wood, Japanese cedar wood and the like. Among them, Japanese cypress wood is preferable because relaxation effects and the like produced by various types of activities such as a fitness activity can easily be enhanced.

When Japanese cypress wood is used, in terms of easily enhancing the relaxation effects and the like, it is preferable to arrange the Japanese cypress wood in the uppermost surface of the flooring material. In the present invention, the "uppermost surface of the flooring material" means a surface on a side opposite to a surface of the flooring material installed on the floor surface or the wall surface facing the floor surface or the wall surface.

The size, the thickness, the shape and the like of the building material are not particularly limited, and can be adjusted according to the scale and the like of the floor surface or the wall surface on which the flooring material is installed.

[Device]

As the device included in the flooring material of the present invention, any device which is generally provided in a floor surface or wall surface is mentioned. Examples of the device as described above include devices which are used for environmental control (on temperature, humidity and the like), electricity distribution and the like.

Examples of the preferable device included in the flooring material of the present invention include heat generators (such as a floor heating mat, a heater and an electric heating sheet).

The flooring material of the present invention preferably includes a heat generator. The heat generator is a device which can adjust, to a high temperature, the temperature of a space in which the flooring material of the present invention is installed.

The temperature of the space adjusted by the heat generator can be set as necessary according to the type of facility in which the flooring material is installed and the like. When the facility in which the flooring material is installed is a fitness studio, for example, the temperature may be adjusted to 30 degrees or more and 45 degrees or less. When the place in which the flooring material is installed is a sauna, for example, the temperature may be adjusted to 40 degrees or more and 120 degrees or less.

The flooring material which includes the heat generator together with the stone material is used, and thus it is possible to expect that the amount of infrared radiation emitted from the stone material is increased to more enhance the anti-aging effects produced by a fitness studio, a sauna or the like.

In terms of easily enhancing effects (for example, the effect of increasing the amount of infrared radiation from the stone material) produced by the heat generator, the heat generator is preferably arranged on the side of a lower layer (surface on the side facing the floor surface, the wall surface or the like) with respect to the stone material.

The size of the heat generator, the number of heat generators and the like are not particularly limited, and can be adjusted according to the scale of the floor surface or the wall surface on which the flooring material is installed, the type of facility (such as a fitness studio or a sauna) in which the flooring material is installed and the like. For example, when the flooring material of the present invention is installed in a hot yoga studio, in order to keep an indoor environment at a high temperature (in general, 30 degrees or more and 45 degrees or less), the heat generator is installed over the entire floor surface. For example, when the flooring material of the present invention is installed in a sauna room, in order to keep an indoor environment at a high temperature (in general, 40 degrees or more and 120 degrees or less), the heat generator is installed over the entire wall surface.

(Arrangement of Materials of Flooring Material)

When the flooring material of the present invention is a combination of a stone material and other materials, the arrangement of the materials, the position of the stone material and the like are not particularly limited, and thus the materials may be aligned or stacked in any order.

When the flooring material of the present invention is a combination of a stone material and other materials, in terms of preventing the movement and damage of the stone material, a hole may be formed in a plate (such as plywood or a resin board) and the stone material may be installed in the hole.

When the flooring material of the present invention includes a plurality of pieces of stone material, in terms of easily achieving the effects of the present invention, the intervals between the pieces of stone material are preferably substantially the same. For example, the intervals between the pieces of stone material may be preferably 100 mm or more and 3000 mm or less and more preferably 500 mm or more and 2000 mm or less.

When the flooring material of the present invention is a multilayer of a stone material and other materials, as a preferable example, a multilayer is mentioned in which a particle board, a plate (such as a veneer board), the heat generator, the stone material (more preferably, the stone material arranged in a hole formed in a plate) and wood (such as Japanese cypress wood) are provided in this order from a lower layer (surface on the side facing the floor surface or the wall surface).

(Installation of Flooring Material)

The flooring material of the present invention can be installed in any environment (preferably, an indoor environment).

Although the position in which the flooring material of the present invention is installed and the like are not particularly limited, the flooring material is generally arranged to cover a part or the whole of the floor surface or the wall surface. When the flooring material of the present invention is installed on the floor surface, an exercise such as a fitness activity can be performed on the flooring material of the present invention or a user can sit on the flooring material of the present invention to bathe in a sauna. When the flooring material of the present invention is installed on the wall surface, an exercise such as a fitness activity can be performed or a user can bathe in a sauna surrounded by the flooring material of the present invention.

When the flooring material of the present invention is installed on the floor surface, the flooring material may be installed with the floor being raised by a support material or the like or may be installed directly on the floor surface.

(Application of Flooring Material)

The flooring material of the present invention can be used in any of facilities, centers and the like in which a floor surface, a wall surface or the like is provided.

In terms of easily achieving the effects of the present invention to enhance the anti-aging effects produced by activities in various types of facilities, the flooring material of the present invention is preferably used in a fitness studio or a sauna.

In the present invention, the "activities in various types of facilities" means arbitrary activities performed in the facilities. The "activity" includes both an activity in motion and an activity at rest, and examples thereof include an exercise, bathing (such as whole-body bathing and foot bathing), meditation, sleep, an aesthetic activity, relaxation and the like. The "facility" includes places corresponding to the types of activities described above and the like, and may be in a closed space or an open space. The "facility" may be an independent building or the like or part of a building or the like.

In the present invention, the "fitness activity" means an exercise which is performed for health or the like. Specific examples thereof include yoga, muscle training, running, walking and the like.

In the present invention, the "fitness studio" means a facility or a center in which a fitness activity is performed. In general, the fitness studio is an indoor facility, and includes a space surrounded by a floor surface, a wall surface and a ceiling surface.

The flooring material of the present invention is preferably used in a yoga studio. As yoga, a normal yoga which is performed at room temperature (in general, 4 degrees or more and less than 30 degrees) and hot yoga which is performed under high temperature and humidity conditions are known, and in terms of particularly easily obtaining the effects of the present invention, the flooring material of the present invention is particularly preferably used in a hot yoga studio.

When the flooring material of the present invention is used in a hot yoga studio, the conditions of hot yoga are not particularly limited. In general, hot yoga is performed in an indoor environment. The temperature condition of hot yoga is preferably 30 degrees or more and 45 degrees or less and more preferably 30 degrees or more and 40 degrees or less. For the humidity condition of hot yoga, the relative humidity is preferably 50% or more and 85% or less (more preferably, 60% or more and 75% or less).

The hot yoga studio generally includes a heat generator and a humidifier in order to control an indoor environment.

In the present invention, the "sauna" means bathing in an indoor space set at high temperature or a bathing facility therefor. The sauna in the present invention includes both a dry type (sauna under dry conditions) and a wet type (sauna under the presence of water vapor).

When the flooring material of the present invention is used in a sauna, the conditions of the sauna are not particularly limited. In general, the sauna is performed in an indoor environment. The temperature condition of the sauna is preferably 40 degrees or more and 120 degrees or less and more preferably 50 degrees or more and 90 degrees or less. For the humidity condition of the sauna, the relative humidity is preferably 10% or more and 100% or less and more preferably 70% or more and 100% or less. The bathing time of the sauna does not need to be excessive, and can be set as necessary according to the temperature condition of the sauna and the like, and the bathing time is preferably 5 minutes or more and 60 minutes or less and more preferably 10 minutes or more and 20 minutes or less.

The sauna generally includes a heat generator in order to control an indoor environment.

(Structure for Fitness Studios)

The structure for fitness studios according to the present invention includes the flooring material of the present invention.

In the present invention, the "structure for fitness studios" means a building which includes a space large enough to perform an exercise.

Although the structure of the structure for fitness studios according to the present invention is not particularly limited, in general, the structure includes a space surrounded by at least a floor surface, a wall surface and a ceiling surface.

The materials, the structure and the like of the structure for fitness studios are not particularly limited, and any of materials, structures and the like which are used for normal buildings can be adopted.

The flooring material of the present invention is installed on any surface of the structure for fitness studios. The flooring material of the present invention is generally installed on the floor surface of the structure for fitness studios, a fitness activity is performed on the floor surface and thus it is possible to more enhance the anti-aging effects obtained from the fitness activity.

(Structure for Saunas)

The structure for saunas according to the present invention includes the flooring material of the present invention.

In the present invention, the "structure for saunas" means a building which includes a space large enough for a whole body to bathe therein.

Although the structure of the structure for saunas according to the present invention is not particularly limited, in general, the structure includes a space surrounded by at least a floor surface, a wall surface and a ceiling surface.

The materials, the structure and the like of the structure for saunas are not particularly limited, and any of materials, structures and the like which are used for normal buildings can be adopted. For example, as the structure for saunas, a commercially available household sauna may be used.

The flooring material of the present invention is installed on any surface of the structure for saunas. For example, when the structure for saunas includes a seat portion, a stone material is arranged below a seat surface and on a wall surface inside the structure, and thus it is possible to easily exert the effects produced by the flooring material of the present invention on the whole body including the feet and the upper body of a bather. In terms of enhancing the relaxation effects and the like, wood (Japanese cypress wood) may be provided on the wall surface inside the sauna.

EXAMPLES

Although the present invention will be described in more detail below using an Example, the present invention is not limited to the Example.

<<Test in Hot Yoga Studio>>

By the following method, a stone material in the present invention was installed in a hot yoga studio, and variations in the expression and the like of various types of genes before and after a hot yoga lesson performed in the studio were evaluated.

A test in the present example corresponds to an open-label parallel-group trial.

<Preparation of Stone Material>

A stone material having a composition shown in the section of the "present invention" of table 1 was prepared. The shape of the stone material was a substantially cylindrical shape having a diameter of about 100 mm and a thickness of about 10 mm.

For reference, the compositions of various types of lava and the like are also shown. The details of the types of lave and the like are as follows.

Reference 1: Stone material collected from The Volcano (Canada)
Reference 2: Lava collected in Indonesia
Reference 3: Stone material collected from Mt. Fuji (Japan)

The compositions shown in table 1 were analyzed based on results obtained by fluorescent X-ray analysis (X-ray fluorescence analysis, XRF) and ICP mass analysis (ICP-Mass Spectrometry, ICP-MS). The unit of values in table 1 is "percent by mass".

TABLE 1

| Components | Present invention | Reference 1 | Reference 2 | Reference 3 |
|---|---|---|---|---|
| Silicon dioxide (Silica anhydride, $SiO_2$) | 70.80 | 52.20 | 53.70 | 49.70 |
| Aluminum oxide ($Al_2O_3$) | 18.80 | 14.60 | 19.20 | 18.40 |
| Ferric oxide ($Fe_2O_3$) | 4.45 | 11.70 | 8.35 | 11.40 |
| Potassium oxide ($K_2O$) | 2.30 | 1.02 | 2.10 | 0.81 |
| Sodium oxide ($Na_2O$) | 1.06 | 2.57 | 3.21 | 2.42 |
| Calcium oxide (CaO) | 0.90 | 9.42 | 9.57 | 11.00 |

TABLE 1-continued

| Components | Present invention | Reference 1 | Reference 2 | Reference 3 |
|---|---|---|---|---|
| Titanium oxide ($TiO_2$) | 0.81 | 1.78 | 0.90 | 1.40 |
| Magnesium oxide (MgO) | 0.56 | 6.14 | 2.41 | 4.36 |
| Diphosphorus pentoxide ($P_2O_5$) | 0.10 | 0.24 | 0.31 | 0.28 |
| Sulfur trioxide ($SO_3$) | 0.07 | 0.02 | — | 0.01 |
| Manganese oxide (MnO) | 0.07 | 0.16 | 0.21 | 0.18 |
| Zirconium oxide ($ZrO_2$) | 0.03 | 0.01 | 0.01 | 0.01 |
| Chromium oxide ($Cr_2O_3$) | 0.03 | 0.04 | — | 0.02 |
| Zinc oxide (ZnO) | 0.02 | 0.02 | 0.01 | 0.01 |
| Strontium oxide (SrO) | 0.01 | 0.04 | 0.06 | 0.05 |
| Rubidium oxide ($Rb_2O$) | 0.01 | 0.00 | 0.01 | — |
| Nickel oxide (NiO) | 0.01 | 0.03 | 0.01 | 0.01 |
| Copper oxide (CuO) | — | 0.01 | 0.01 | 0.02 |
| Cobalt oxide ($Co_2O_3$) | — | — | 0.01 | 0.02 |
| Lithium (Li) | 0.005 | — | — | — |
| Boron (B) | 0.003 | — | 0.002 | 0.002 |
| Vanadium (V) | 0.007 | 0.015 | 0.019 | 0.037 |
| Copper (Cu) | 0.002 | — | — | — |
| Gallium (Ga) | 0.002 | 0.002 | 0.002 | 0.002 |
| Niobium (Nb) | 0.001 | 0.001 | — | — |
| Barium (Ba) | 0.024 | 0.016 | 0.033 | 0.015 |
| Lead (Pb) | 0.002 | — | 0.002 | — |
| Cerium (Ce) | — | 0.002 | — | — |

As shown in table 1, in the stone material in the present invention, the content of silicon dioxide ($SiO_2$) was remarkably high as compared with normal stone materials.

<Installation of Stone Material in Hot Yoga Studio>

By the following method, the stone material in the present invention was installed on the floor surface of the hot yoga studio.

(1) Floor Raising

An indoor space having a floor area of about 92 $m^2$ was prepared. Floor raising work was performed in the space, and a particle board (thickness of 20 mm) and a veneer board (thickness of 12 mm) on the particle board were placed over the entire floor surface.

(2) Installation of Floor Heating Mat

After the floor raising, over the entire upper surface of the veneer board placed, plane floor heating mats (product name "HFM series", thickness of 12 mm, made by Rinnai Corporation) were aligned to be installed.

(3) Installation of Stone Material

Over the entire upper surfaces of the floor heating mats installed, a veneer board (thickness of 12 mm) was placed. In the veneer board, a plurality of holes were previously opened to correspond to the shape and installation position of the stone material. Then, pieces of stone material were fitted into the holes of the veneer board, and thus the stone material was installed on the floor surface. The stone material was installed over the entire floor surface such that the pieces of stone material were spaced a distance of about 3000 mm from each other.

(4) Installation of Japanese Cypress Wood

After the installation of the stone material, Japanese cypress wood (plate material having a thickness of 15 mm) was placed over the entire floor surface.

A cross-sectional view around the floor surface of the hot yoga studio in which the stone material was installed is shown in FIG. 1. In FIG. 1, the entire material including the particle board, the veneer boards (corresponding to two layers), the floor heating mats, the stone material and the Japanese cypress wood corresponds to the flooring material in the present example.

<Selection of Subjects>

48 persons were selected who satisfied all "entry criteria" below and did not apply to "exclusion criteria" below (by subject's self-report).

(Entry Criteria)
(1) The subject was a Japanese woman who was 20 or more and 59 or less years old at the time of entry.
(2) The subject was able to take a hot yoga lesson of 60 minutes twice a week for 3 months without fail.
(3) The subject was aware of lack of exercise.
(4) The subject was able to finish a meal at least 12 hours before a lesson start time on the day before the hot yoga lesson and to fast until the end of an inspection on the day of the lesson (however, the subject was able to take sufficient water (mineral water)).
(5) The BMI (weight(kg)/[height (m)]$^2$) of the subject was 22 or more and 25 or less.

(Exclusion Criteria)
(1) A person who was pregnant or might be pregnant or a person who was breastfeeding
(2) A person who might become pregnant during a test period
(3) A person who visited a hospital for treatment of illnesses or a person who received medication
(4) A person who had a history of a serious hepatic, renal or cardiac disorder
(5) A person who had a chronic skin symptom (such as atopic dermatitis)
(6) A person who was then attending a yoga or hot yoga class regularly
(7) A person who had a symptom of an acute pain or pruritus (such as a fracture, sprain or separated flesh)
(8) A person who was then exercising for more than an hour at least 3 times a week
(9) A person who had attended a hot yoga class (excluding a yoga class at normal room temperature) for 3 months or more
(10) A person who might be on a business trip or transfer
(11) A person who was busy with work or housework to have difficulty taking a yoga lesson for 60 minutes twice a week
(12) A person who was unlikely to take long-lasting lessons
(13) A person who worked for a fitness-related company (such as a yoga studio or a sports gym) or a person whose family member or relative living together worked for a fitness-related company (such as a yoga studio or a sports gym)
(14) A person who suffered from an infectious disease (such as HIV, hepatitis virus or syphilis)

<Performance of Test>

A studio (hereinafter also referred to as "studio-1") which was prepared according to the <Installation of stone material in hot yoga studio> described above and a studio (hereinafter also referred to as "studio-2") which was prepared as for studio-1 except that "(3) Installation of stone material" was not performed in the <Installation of stone material in hot yoga studio> described above (a veneer board (thickness of 12 mm) without holes being opened was placed over the entire upper surfaces of the floor heating mats installed) were used, the subjects were divided into two groups and the test was performed. Specifically, in each of "studio-1" and "studio-2", a hot yoga lesson was performed on the subjects as follows.

(Details of Hot Yoga Lesson)
Temperature: room temperature (around 35 degrees)
Relative humidity: around 60%
One lesson time: 60 minutes
Lesson intensity: for beginners
Number of lessons: twice a week for 3 months An outline of the subjects in the "studio-1" group and the "studio-2" group is shown in table 2.

TABLE 2

|  | Studio-1 group (including stone material) | Studio-2 group (excluding stone material) |
| --- | --- | --- |
| Number of persons (people) | 25 | 23 |
| Average age (years) | 36.4 ± 7.6 | 42.2 ± 8.9 |
| Sex | Women only | Women only |

During the test period, the subject was caused to comply with the following items.
(1) During the test period, the subject took a hot yoga lesson of 60 minutes twice a week for 3 months without fail.
(2) The subject finished a meal at least 12 hours before a studio visit time on the day before the lesson and fasted until the end of the inspection on the day of the test (however, the subject took sufficient water (mineral water)).
(3) During the test period, the subject maintained the same living environment (sleep, diet and general life) as before the start of the test.
(4) During the test period, the subject was prohibited from adding and changing the skin care and makeup products used, supplements used and the like.

(Measurement Items)

The following items were evaluated before and after the hot yoga lesson (in other words, immediately before the lesson on the test start date and immediately after the lesson on the test end date).

(Item 1-A) Health-related QOL ("SF-36v2", based on January 2015 edition)
(Item 1-B) Body structure (muscle mass, body fat mass, body weight and BMI)
(Item 1-C) Skin characteristics (skin water content, skin elasticity and texture analysis)
(Item 1-D) General blood inspections
(Item 1-E) Genetic inspections (target genes: glyceraldehyde 3-phosphate dehydrogenase (GAPDH), Sirtuin 1 (SIRT1), Sirtuin 6 (SIRT6), human telomere reverse transcriptase (hTERT) and human telomere RNA component (hTERC))

For item 1-A, in all the subjects, the results of the evaluation after the lesson tended to be satisfactory as compared with those before the lesson. However, there was almost no difference between the "studio-1" group and the "studio-2" group.

For item 1-B, in all the subjects, the muscle mass after the lesson tended to increase, and the body fat mass, the body weight and the BMI tended to decrease as compared with those before the lesson. However, there was almost no difference between the "studio-1" group and the "studio-2" group.

For item 1-C, in all the subjects, the water content, the elasticity, the texture volume ratio and the texture number after the lesson tended to increase, the texture depth tended to decrease and the skin characteristics tended to be satisfactory as compared with those before the lesson. However, there was almost no difference between the "studio-1" group and the "studio-2" group.

For item 1-D, in all the subjects, there was almost no difference in the results of the inspections before and after the lesson or the results of the inspections after the lesson tended to be satisfactory as compared with those before the lesson. However, there was almost no difference between the "studio-1" group and the "studio-2" group.

For item 1-E, it is known that all SIRT1, SIRT6, hTERT and hTERC are genes related to aging and the high expression of these genes can cause the suppression of active oxygen generation, the suppression of aging and the like. The results of FIGS. 2 to 5 were obtained by correcting the amounts of expression of the genes with the amount of expression of GAPDH. As shown in FIGS. 2 to 5, in each of the subjects, the amounts of expression of the genes tended to increase after the lesson as compared with those before the lesson. Furthermore, in the "studio-1" group, the amounts of expression of the genes tended to increase as compared with those in the "studio-2" group. The results of item 1-E were analysis results obtained by the real-time PCR method using blood samples collected from the subjects.

Although not shown in the data, the amount of infrared radiation in "studio-1" tended to be higher than that in the "studio-2".

It has been found from the results described above that the flooring material of the present invention is used to enhance the anti-aging effects obtained from hot yoga.

<<Test in Sauna>>

By the following method, the same stone material as used in the <<Test in hot yoga studio>> described above was installed in a sauna, and variations in the expression and the like of various types of genes before and after bathing in the sauna were evaluated.

The test in the present example corresponds to a parallel-group trial.

<Installation of Stone Material in Sauna>

By the following method, the stone material in the present invention was installed in a sauna room.

(1) Preparation of Sauna

As the sauna, a commercially available household sauna (capacity: one person, product name "Hitachi Home Sauna SE2000" made by Hitachi, Ltd.) was prepared. The sauna includes a heat generator, a seat portion and the like.

(2) Installation of Stone Material

Figure 6:
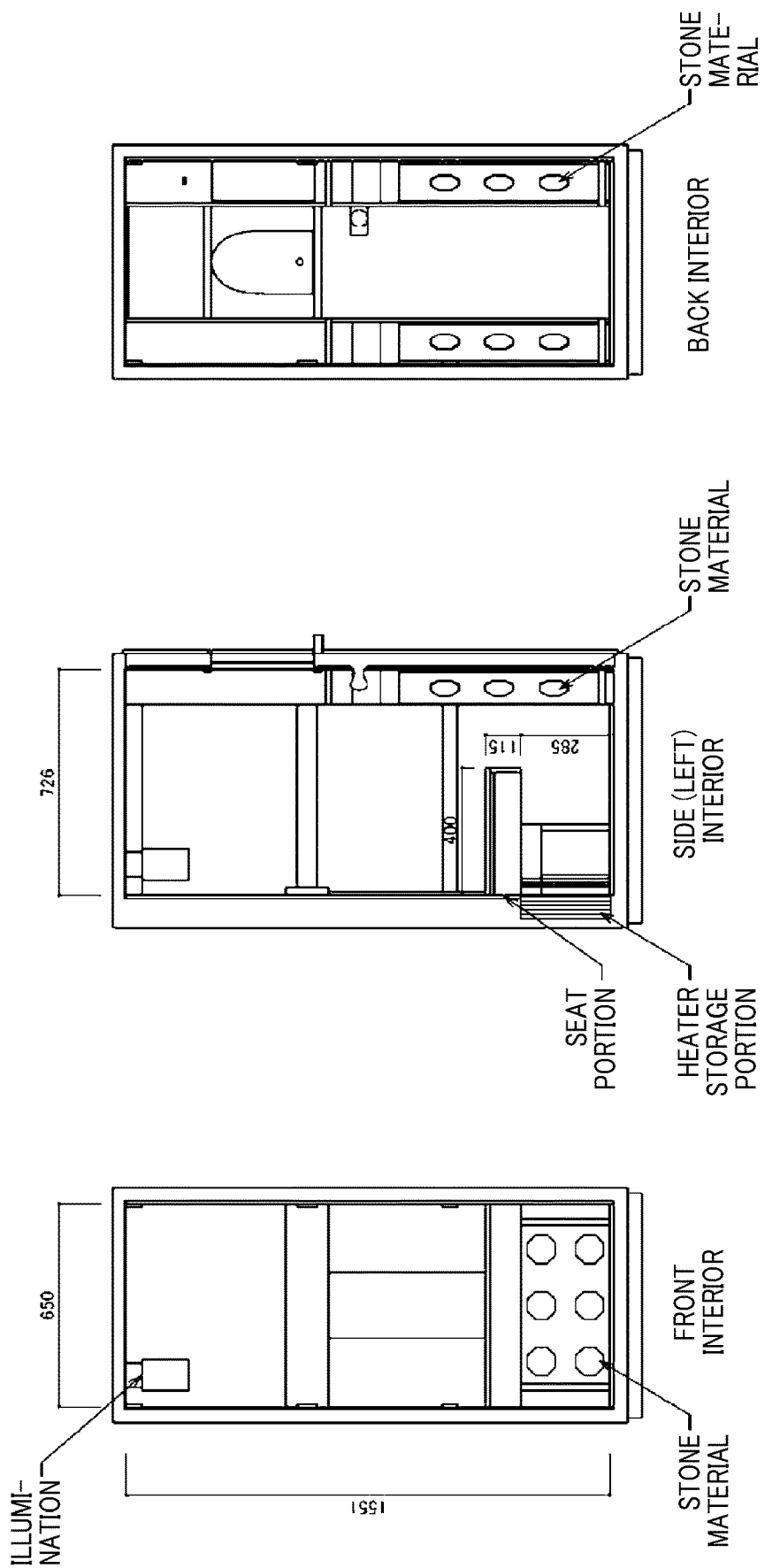
FIG. 6 is a cross-sectional view of a sauna used in an Example.

The total of 12 pieces of stone material were installed in the sauna room. Specifically, 6 pieces of stone material were installed below the seat surface of the seat portion, and 3 pieces of stone material were installed in each of the side surfaces of the sauna room. The pieces of stone material installed had the same composition (having the composition shown in the item of the "present invention" in table 1) and shape as used in the <<Test in hot yoga studio>> described above. A cross-sectional view (a front interior, a side interior and a back interior) of the sauna in which the stone material was installed is shown in FIG. 6. Although not shown in the figure, the heat generator (electric heating sheet) was arranged in the wall surface of the sauna room, a wire net was placed over a surface (surface on a side opposite to the side of the wall surface of the sauna) of the heat generator, and the stone material was fixed on the wire net.

In FIG. 6, all the stone material, the unillustrated heat generator (electric heating sheet) and the wire net correspond to the flooring material in the present example.

<Performance of Test>

A sauna (hereinafter also referred to as "sauna-1") which was prepared according to the <Installation of stone material in sauna> described above and a sauna (hereinafter also referred to as "sauna-2") which was prepared as for sauna-1 except that "(2) Installation of stone material" was not performed in the <Installation of stone material in sauna> described above were used, the subjects were divided into two groups and the test was performed. Specifically, under the following conditions, the subjects were caused to bathe in either of "sauna-1" and "sauna-2".

(Sauna Bathing Conditions)

Test period: 27 days
Temperature in sauna room: around 50 degrees
Relative humidity in sauna room: around 60%
Bathing frequency: 3 days a week, twice a day
Bathing time: 10 minutes at minimum to 20 minutes at maximum per bath An outline of the subjects in the "sauna-1" group and the "sauna-2" group is shown in table 3.

TABLE 3

| | Sauna-1 group (including stone material) | Sauna-2 group (excluding stone material) |
|---|---|---|
| Number of persons (people) | 9 | 10 |
| Age (years) | 20s to 40s | 20s to 40s |
| Sex | Women: 6 persons Men: 3 persons | Women: 7 persons Men: 3 persons |

(Measurement Items)

The following items were evaluated before and after bathing in the sauna (in other words, immediately before bathing on the test start date and immediately after bathing on the test end date).

(Item 2-A) Genetic inspections (target genes: Sirtuin 1 (SIRT1) and Sirtuin 6 (SIRT6))

(Item 2-B) Oxidative stress marker (8-hydroxy-2'-deoxyguanosine (8-OHdG))

(Item 2-C) Skin characteristics (skin water content, skin elasticity and texture analysis)

Figure 7:
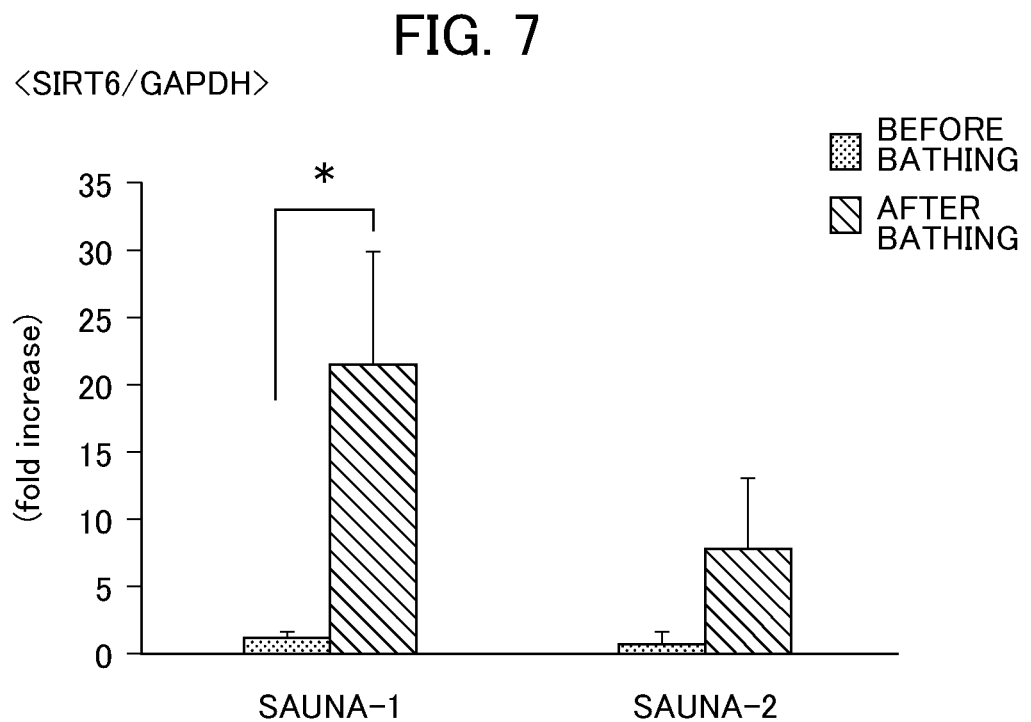
FIG. 7 is a diagram showing the influence of the flooring material of the present invention on the expression of SIRT6 after bathing in the sauna.

For item 2-A, it is known that both SIRT1 and SIRT6 are genes related to aging and the high expression of these genes can cause the suppression of active oxygen generation, the suppression of aging and the like. The results of FIG. 7 were obtained by correcting the amount of expression of SIRT6 gene with the amount of expression of GAPDH. A t-test was used for a significant difference test between trials, and it was determined that there was a significant difference when a risk rate was less than 5% (*$p<0.05$). As shown in FIG. 7, in the "sauna-1" group, the amount of expression of SIRT6 gene after bathing was significantly higher than that in the "sauna-2" group. Although not shown in the data, and for the expression of SIRT1 gene, there was no significant difference between the "sauna-1" group and the "sauna-2" group, in each of the groups, the amount of expression of SIRT1 gene after bathing tended to be higher than that before bathing.

The results of item 2-A were analysis results obtained by the real-time PCR method using blood samples collected from the subjects.

Figure 8:
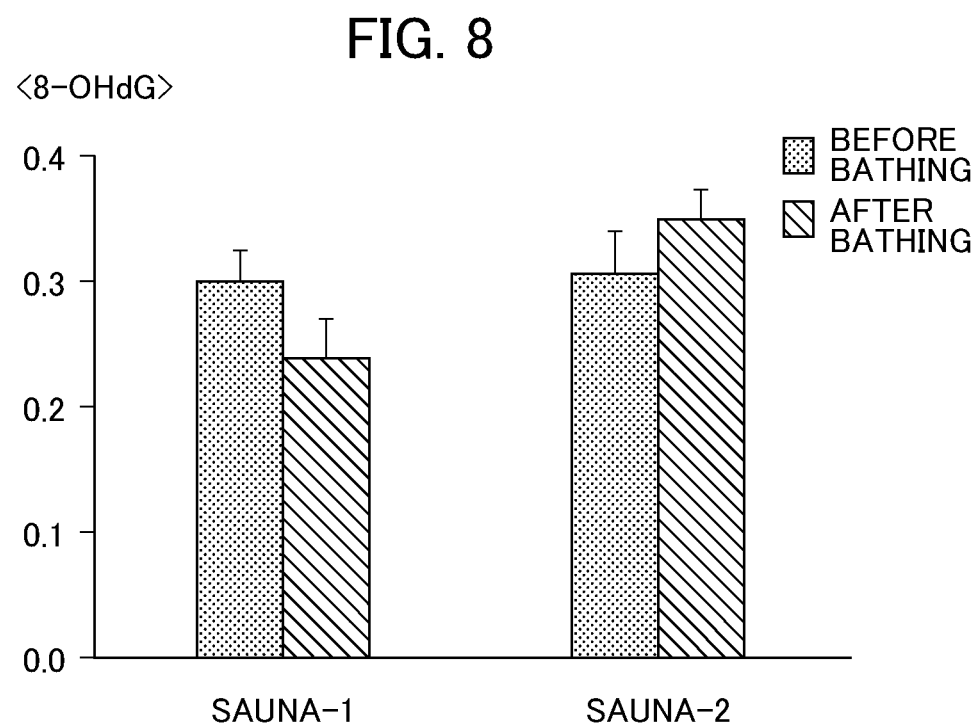
FIG. 8 is a diagram showing the influence of the flooring material of the present invention on the concentration of 8-OHdG in a body after bathing in the sauna.

For item 2-B, 8-OHdG is known as an oxidative stress marker, and a higher concentration of 8-OHdG in a body means higher oxidative stress. As shown in FIG. 8, in the "sauna-1" group, the concentration value of 8-OHdG in the body after bathing was lower than that in the "sauna-2" group. An extremely unexpected result was obtained in which the oxidative stress that could increase by a normal sauna was suppressed by the presence of the stone material and furthermore, the oxidative stress level was lower than that before bathing in the sauna.

The results of item 2-B were analysis results obtained by ELISA using blood samples collected from the subjects.

For item 2-C, there was almost no difference between the "sauna-1" group and the "sauna-2" group.

Although not shown in the data, the amount of infrared radiation in "sauna-1" tended to be higher than that in the "sauna-2".

Although not shown in the data, when Japanese cypress wood was provided in the wall surface of the sauna (between the electric heating sheet and the wire net), and the stone material was installed on the surface of the Japanese cypress wood, the anti-aging effects tended to be more enhanced.

It has been found from the results described above that the flooring material of the present invention is used to enhance the anti-aging effects obtained from a sauna while suppressing oxidative stress.

The invention claimed is:

1. A flooring material comprising:
    a stone material; and
    wood in an uppermost surface,
        wherein the stone material comprises 67.0% or more and 80.0% or less by mass of silicon dioxide with respect to the entire stone material;
        wherein the stone material comprises 3.0% or more and 10.0% or less by mass of ferric oxide with respect to the entire stone material;
        wherein the stone material comprises 0.5% or more and 1.5% or less by mass of sodium oxide with respect to the entire stone material;
        wherein the stone material comprises 0.05% or more and 0.2% or less by mass of diphosphorus pentoxide; and
        wherein the flooring material is a floor of a structure.

2. The flooring material according to claim 1, wherein the stone material comprises 20.0% or less by mass of aluminum oxide with respect to the entire stone material.

3. A flooring material comprising:
    a stone material; and
    a heat generator,
        wherein the stone material comprises 67.0% or more and 80.0% or less by mass of silicon dioxide with respect to the entire stone material;
        wherein the stone material comprises 3.0% or more and 10.0% or less by mass of ferric oxide with respect to the entire stone material;
        wherein the stone material comprises 0.5% or more and 1.5% or less by mass of sodium oxide with respect to the entire stone material;
        wherein the stone material comprises 0.05% or more and 0.2% or less by mass of diphosphorus pentoxide; and
        wherein the flooring material is a floor of a structure.

4. The flooring material according to claim 1, wherein the wood in the uppermost surface is Japanese cypress wood.

5. A flooring material comprising a stone material,
    wherein the stone material comprises 67.0% or more and 80.0% or less by mass of silicon dioxide with respect to the entire stone material;
    wherein the stone material comprises 3.0% or more and 10.0% or less by mass of ferric oxide with respect to the entire stone material;
    wherein the stone material comprises 0.5% or more and 1.5% or less by mass of sodium oxide with respect to the entire stone material;
    wherein the stone material comprises 0.05% or more and 0.2% or less by mass of diphosphorus pentoxide;
    wherein the flooring material is a floor of a structure; and
    wherein the flooring material is installed in a fitness studio structure or a sauna structure.

6. The flooring material according to claim 5, wherein a fitness activity performed in the fitness studio structure is hot yoga that is performed in an indoor environment with a temperature of 30 degrees Celsius or more and 45 degrees Celsius or less and a relative humidity of 50% or more and 85% or less.

7. A structure for fitness studios or saunas comprising a flooring material that is a floor of the structure,
    wherein the flooring material comprises a stone material;
    wherein the stone material comprises 67.0% or more and 80.0% or less by mass of silicon dioxide with respect to the entire stone material;
    wherein the stone material comprises 3.0% or more and 10.0% or less by mass of ferric oxide with respect to the entire stone material;
    wherein the stone material comprises 0.5% or more and 1.5% or less by mass of sodium oxide with respect to the entire stone material; and
    wherein the stone material comprises 0.05% or more and 0.2% or less by mass of diphosphorus pentoxide.

8. The flooring material according to claim 1, wherein the flooring material is intended for use in a sauna structure.

9. A structure for saunas comprising the flooring material according to claim 8.

* * * * *